United States Patent
Cheng et al.

(10) Patent No.: US 11,642,632 B2
(45) Date of Patent: May 9, 2023

(54) NANOFILTRATION COMPOSITE MEMBRANES

(71) Applicant: NEW MICROPORE, INC., Hsinchu (TW)

(72) Inventors: Shu-Hui Cheng, Hsinchu (TW); Kai-Wei Chiou, Hsinchu (TW)

(73) Assignee: NEW MICROPORE, INC., Hsinchu (TW)

( * ) Notice: Subject to any disclaimer, the term of this patent is extended or adjusted under 35 U.S.C. 154(b) by 377 days.

(21) Appl. No.: 17/097,851

(22) Filed: Nov. 13, 2020

(65) Prior Publication Data
US 2022/0152564 A1 May 19, 2022

(51) Int. Cl.
*B01D 71/82* (2006.01)
*B01D 71/56* (2006.01)
(Continued)

(52) U.S. Cl.
CPC ........... *B01D 71/82* (2013.01); *B01D 61/027* (2013.01); *B01D 67/0006* (2013.01);
(Continued)

(58) Field of Classification Search
CPC ........ B01D 69/10; B01D 69/12; B01D 71/56; B01D 71/68
See application file for complete search history.

(56) References Cited

U.S. PATENT DOCUMENTS

2015/0343393 A1* 12/2015 Yoneda ................. B01D 61/08
210/490

FOREIGN PATENT DOCUMENTS

| CN | 104548975 A | 4/2015 |
|---|---|---|
| CN | 108187512 A | 6/2018 |

(Continued)

OTHER PUBLICATIONS

An Office Action (w/English-translation) dated Dec. 22, 2021 in CN Application No. 202010738630.4, 11 pages.

*Primary Examiner* — Ryan B Huang
(74) *Attorney, Agent, or Firm* — Muncy, Geissler, Olds & Lowe, P.C.

(57) ABSTRACT

Provided is a nanofiltration composite membrane, comprising: a supporting layer comprising a polyethylene terephthalate, a polymeric porous layer formed on the supporting layer, the polymeric porous layer comprising a polysulfone and an amphiphilic polymer represented by the formula below:

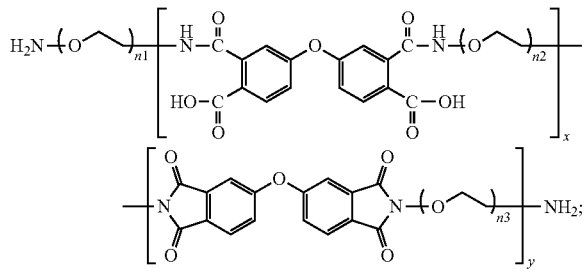

and an interfacial polymerization layer formed on the polymeric porous layer and the interfacial polymerization layer comprising polyamide which is synthesized by polymerizing piperazine with 1,3,5-benzenetricarbonyl trichloride; wherein, n1, n2, n3, x, and y are integers greater than 0, the molecular weight of the amphiphilic polymer ranges from 90,000 to 200,000, and a weight ratio of the polysulfone to the amphiphilic polymer ranges from 2 to 20. The nanofil- (Continued)

tration composite membrane can increase the removal rate of divalent ions and separate substances of specific molecular weights in solutions.

20 Claims, 1 Drawing Sheet

(51) Int. Cl.
    *B01D 71/68*     (2006.01)
    *B01D 61/02*     (2006.01)
    *B01D 69/02*     (2006.01)
    *B01D 69/12*     (2006.01)
    *B01D 67/00*     (2006.01)
    *B01D 69/10*     (2006.01)

(52) U.S. Cl.
    CPC ........... *B01D 69/02* (2013.01); *B01D 69/125* (2013.01); *B01D 71/56* (2013.01); *B01D 71/68* (2013.01); *B01D 69/10* (2013.01); *B01D 2323/12* (2013.01); *B01D 2323/18* (2013.01); *B01D 2323/36* (2013.01); *B01D 2325/04* (2013.01); *B01D 2325/20* (2013.01)

(56) References Cited

FOREIGN PATENT DOCUMENTS

| | | |
|---|---|---|
| CN | 108421422 A | 8/2018 |
| CN | 110496533 A | 11/2019 |
| WO | WO-2012/028045 A1 | 3/2012 |

* cited by examiner

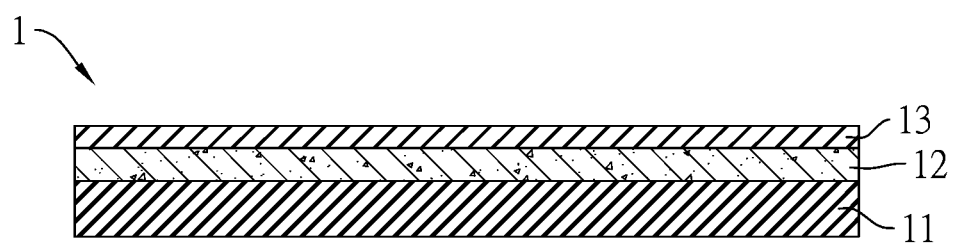

NANOFILTRATION COMPOSITE MEMBRANES

BACKGROUND OF THE INVENTION

1. Field of the Invention

The instant disclosure relates to nanofiltration composite membranes, more particular to nanofiltration composite membranes comprising multi-layered polymer structures.

2. Description of the Prior Arts

The technology of membrane separation has the advantages of being operatable at room temperature, low energy consumption, low pollution, and so on. Therefore, it is widely applied in the fields of food, medical care, water softening, and industrial sewage disposal. However, as the demands for the performance of nanofiltration composite membranes gradually increase, the nanofiltration composite membranes require functions of high accuracy of molecular weight cutoff, high permeate flux and high ion selectivity. However, many nanofiltration composite membranes on the market do not have all aforesaid functions. More particularly, many nanofiltration composite membranes on the market have permeate fluxes below 40 L/m²/hr.

Common nanofiltration composite membranes each comprise an interfacial polymerization layer, a porous layer, and a supporting layer in the order of filtration from outside to inside. The outermost interfacial polymerization layer can provide the separation function while the separation function of the nanofiltration composite membrane depends on the degree of crosslinking of the porous layer and interfacial polymerization layer, the distribution density of the porous layer, and the thickness of the interfacial polymerization layer. According to one of the conventional methods, polyethylene glycol is used to reduce the surface tension during phase inversion of coating solution, and the pores are formed after polysulfone precipitates from the solution. Or, nonionic surfactant or cationic surfactant is used. However, removal rates of divalent ions in the abovementioned documents are all below 96%.

Therefore, to meet the high demands of the function of filtration of nanofiltration composite membrane, nanofiltration composite membrane with high removal rates of divalent ions, high permeate flux, and a certain extent of removal rate of univalent ions is urgently needed to increase the usage efficiency.

SUMMARY OF THE INVENTION

To overcome the shortcoming of low removal rate of divalent ions, the instant disclosure provides a nanofiltration composite membrane having high removal rate of divalent ions.

To achieve aforesaid object, the instant disclosure provides a nanofiltration composite membrane, comprising:
a supporting layer comprising a polyester;
a polymeric porous layer formed on the supporting layer, the polymeric porous layer comprising a polysulfone and an amphiphilic polymer represented by the formula below:

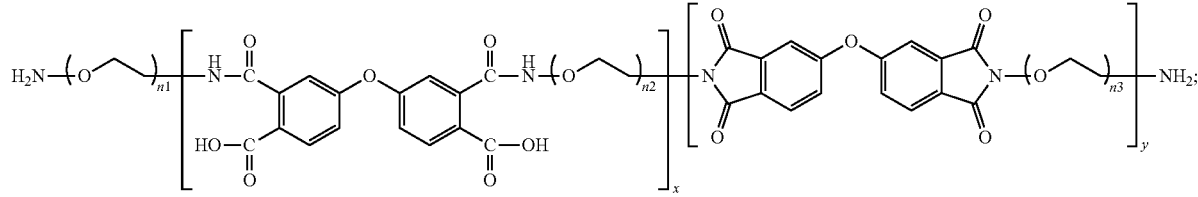

and
an interfacial polymerization layer formed on the polymeric porous layer and comprising polyimide;
wherein, n1, n2, n3, x, and y are integers greater than 0, the molecular weight of the amphiphilic polymer ranges from 90,000 to 200,000, and a weight ratio of the polysulfone to the amphiphilic polymer is greater than or equal to 2 and less than or equal to 20.

As the weight ratio of the polysulfone to the amphiphilic polymer in the polymeric porous layer ranges from 2 to 20, the nanofiltration composite membrane of the instant disclosure has high removal rate of divalent ions.

According to the instant disclosure, when the weight ratio of the polysulfone to the amphiphilic polymer in the polymeric porous layer ranges from 2 to 10, the removal rate of divalent ions of the nanofiltration composite membrane can reach more than 99%. Almost all the divalent ions are completely removed from the solution. This technology is suitable for hard water softening.

According to the instant disclosure, the amphiphilic polymer contains hydrophilic repeated units and lipophilic repeated units. The hydrophilic repeated units and the lipophilic repeated units in the amphiphilic polymer of the instant disclosure are represented by the formulas below:

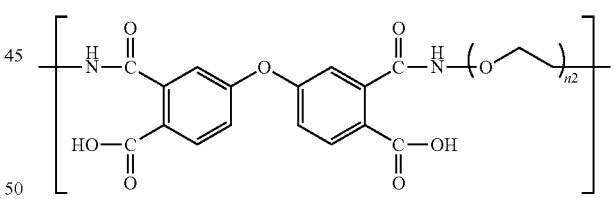

Hydrophilic repeated unit

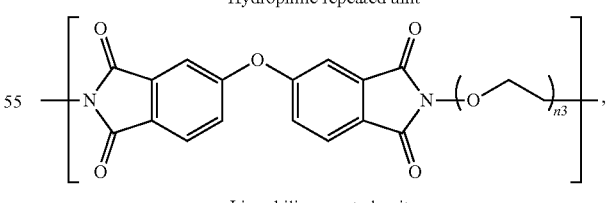

Lipophilic repeated unit wherein, n2 and n3 are integers greater than 0.

According to the instant disclosure, because the amphiphilic polymer contains hydrophilic repeated units and lipophilic repeated units at the same time, the surface tension of the coating solution is reduced. When the microphase separation is generated during phase inversion, the microphase domain is stabilized, which makes the solvent easily replaced and polysulfone precipitates come out. Consequently, the polymeric porous layer with uniform pore distribution can be obtained.

According to the instant disclosure, the thickness of the supporting layer ranges from 0.09 millimeters (mm) to 0.1 mm, the thickness of the polymeric porous layer ranges from 0.02 mm to 0.06 mm, and the thickness of the interfacial polymerization layer ranges from 50 nanometers (nm) to 200 nm. Besides, the total thickness of aforesaid nanofiltration composite membrane can be controlled to be 0.1 mm to 0.16 mm.

According to the instant disclosure, the polyester in the nanofiltration composite membrane can be polyethylene terephthalate.

According to the instant disclosure, the polyamide in the interfacial polymerization layer is synthesized by polymerizing a diamine compound with an acyl chloride compound. Because the amphiphilic polymer in the polymeric porous layer of the instant disclosure contains polyamide group and the interfacial polymerization layer also contains polyamide group, the interfacial polymerization layer and the polymeric porous layer can attach to each other tightly without separation even under high pressure or used for a long time.

According to the instant disclosure, the diamine compound can be piperazine or 1,3-diaminobenzene.

According to the instant disclosure, the acyl chloride compound can be 1,3,5-benzenetricarbonyl trichloride or 1,4-benzenedicarbonyl chloride.

According to the instant disclosure, the polyamide in the interfacial polymerization layer is synthesized by polymerizing piperazine with 1,3,5-benzenetricarbonyl trichloride.

According to the instant disclosure, the removal rate of divalent ions of the nanofiltration composite membrane is greater than 96%. Preferably, the removal rate of divalent ions of the nanofiltration composite membrane is greater than 99%. More preferably, the removal rate of divalent ions of the nanofiltration composite membrane is greater than 99.5%.

According to the instant disclosure, the removal rate of univalent ions of the nanofiltration composite membrane is less than 38%; preferably, the removal rate of univalent ions of the nanofiltration composite membrane is less than 36%; more preferably, the removal rate of univalent ions of the nanofiltration composite membrane is less than 33%; more preferably, the removal rate of univalent ions of the nanofiltration composite membrane is less than 30%. According to the above, the removal rate of divalent ions of the nanofiltration composite membrane can be greater than 96%. Moreover, the removal rate of univalent ions of the nanofiltration composite membrane can be controlled at less than 38% at the same time.

According to the instant disclosure, the difference between the removal rate of divalent ions and univalent ions (as known as ion selectivity) may be greater than 67%.

According to the instant disclosure, the molecular weight cutoff of the nanofiltration composite membrane ranges from 200 Dalton (Da) to 400 Da. Therefore, the nanofiltration composite membrane of the instant disclosure can control the molecular weight of specific substances which are retained by the nanofiltration composite membrane.

According to the instant disclosure, the permeate flux of divalent ion solution through the nanofiltration composite membrane ranges from 40 $L/m^2/hr$ (LMH) to 95 $L/m^2/hr$.

Other objectives, advantages and novel features of the invention will become more apparent from the following detailed description when taken in conjunction with the accompanying drawings.

BRIEF DESCRIPTION OF THE DRAWINGS

Sole FIGURE is a sectional view of the nanofiltration composite membrane of the instant disclosure.

DETAILED DESCRIPTION OF THE PREFERRED EMBODIMENTS

Hereinafter, one skilled in the art can easily realize the advantages and effects of the instant disclosure from the following examples. Therefore, it should be understood that the descriptions proposed herein are just preferable examples for the purpose of illustrations only, not intended to limit the scope of the disclosure. Various modifications and variations could be made in order to practice or apply the instant disclosure without departing from the spirit and scope of the disclosure.

Please refer to the sole FIGURE. The nanofiltration composite membrane 1 was made of polymer. The nanofiltration composite membrane 1 comprised a supporting layer 11, a polymeric porous layer 12 formed on the supporting layer 11, and an interfacial polymerization layer 13 formed on the polymeric porous layer 12.

Ultrafiltration Membrane

Examples 1 to 4

Polysulfone, amphiphilic polymer, lithium chloride, and N-methyl-2-pyrrolidone in Examples 1 to 4 were weighed according to Table 1 below and were stirred smoothly. After that, the mixture was agitated under a speed of 300 revolutions per minute (rpm) and at a temperature over 80° C. for 6 hours, and then degassed under vacuum for 3 hours to render a homogeneous pale yellow coating solution without bubbles. The structural formula of aforesaid polymer is showed below.

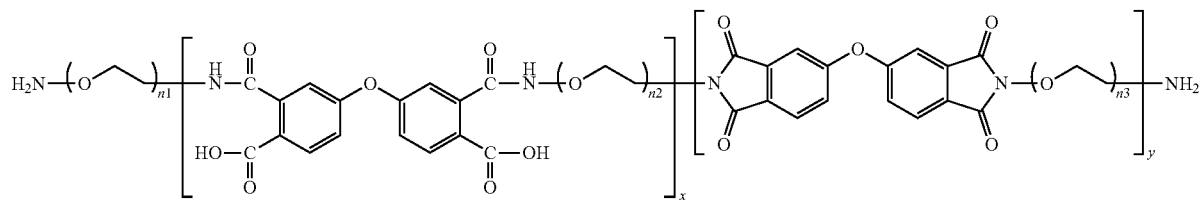

Nonwoven polyester fabric (as a supporting layer) was coated with a coating solution of 25° C. to 26° C. by using a slot-die head with adjustable thickness. The thickness was set as 0.2 mm and the width was set as 1040 mm. Wherein, the thickness of the nonwoven polyester fabric was 0.12 mm, the width of the nonwoven polyester fabric was 1070 mm, and the coating speed was around 3 meters per minute (m/min).

Then the freshly coated nonwoven polyester fabric was immersed in the cosolvent comprising water and organic solvent (N-methyl-2-pyrrolidone) at a ratio of 2:1 to undergo phase inversion, and thus a membrane was formed. At last, the membrane was washed in a pure water tank, and the polymeric porous layer was formed on the nonwoven polyester fabric. The obtained bilayer structure was called ultrafiltration membrane. The ultrafiltration membrane comprised nonwoven polyester fabric and polymeric porous layer formed on the nonwoven polyester fabric.

Comparative Example 1

The production procedure of Comparative Example 1 was almost the same as the production procedure of Examples 1 to 4 except that the amphiphilic polymer was not used or contained in the ultrafiltration membrane of Comparative Example 1.

Analysis 1: Permeate Flux of Pure Water Through Ultrafiltration Membrane

The ultrafiltration membranes of Examples 1 to 4 (E1 to E4) and Comparative Example 1 (C1) were tested under the condition of 25° C. and the pressure of 2 kilograms per square centimeter ($kg/cm^2$) to measure the amounts of pure water passing through the ultrafiltration membranes. The unit of permeate flux is LMH. Results were recorded in Table 1.

Analysis 2: Molecular Weight Cutoff of Ultrafiltration Membrane 1 wt % polyethylene glycol solution was filtered by ultrafiltration membranes of E1 to E4 and C1 respectively. The polyethylene glycol solution filtered by each of the ultrafiltration membranes was collected and tested by liquid chromatograph mass spectrometer to analyze the molecular weight distribution of polyethylene glycol. The results of molecular weight cutoff (MWCO) were showed in Table 1. The unit of molecular weight is Da. Table 1: Weight percentages of starting materials for preparation of the ultrafiltration membranes of E1 to E4 and C1 and test results of the properties of the ultrafiltration membranes of E1 to E4 and C1

| Ultrafiltration membrane | E1 | E2 | E3 | E4 | C1 |
|---|---|---|---|---|---|
| Polysulfone (wt %) | 20 | 20 | 20 | 20 | 20 |
| Amphiphilic polymer (wt %) | 8.5 | 5 | 2.2 | 1.1 | 0 |
| Lithium chloride (wt %) | 1.2 | 1.2 | 1.2 | 1.2 | 1.2 |
| N-methyl-2-pyrrolidone (wt %) | 70.3 | 73.8 | 76.6 | 77.7 | 78.8 |
| Weight ratio of the polysulfone to the amphiphilic polymer | 2.4 | 4 | 9.1 | 18.2 | — |
| Permeate flux of pure water (LMH) | 137 | 177 | 261 | 312 | 426 |
| Molecular weight cutoff (Da) | 6K-10K | 20K-23K | 30K-32K | 50K-52K | 70K-80K |

Nanofiltration Composite Membrane

Examples 1A to 4A

Interfacial polymerization layers were formed on each polymeric porous layer of E1 to E4 by surface condensation. The obtained three-layer structure was called nanofiltration composite membrane. In other words, the nanofiltration composite membrane comprised a supporting layer, a polymeric porous layer, and an interfacial polymerization layer. The procedures of formation of the interfacial polymerization layer on the polymeric porous layer were described below.

The solutions with pH values ranging from 8 to 9 comprising piperazine and 3,5-diaminobenzoic acid were prepared according to Table 2 to render interfacial polymerization layers of Examples 1A to 4A (E1A to E4A). Specifically, piperazine and 3,5-diaminobenzoic acid were weighed according to Table 2 and dissolved in water to obtain the solutions with pH values ranging from 8 to 9. Consequently, the ultrafiltration membranes of E1 to E4 were immersed in aforesaid solutions for 2 minutes respectively. Afterwards, the residual water phase liquid on the surface of the ultrafiltration membranes was removed. The ultrafiltration membranes with water phase were contacted to an organic solution comprising 1,3,5-benzenetricarbonyl trichloride and n-hexane for 45 seconds to 50 seconds. The ultrafiltration membranes were washed by water for 2 minutes after the reaction ended. The nanofiltration composite membranes of E1A to E4A were formed subsequently.

Comparative Example 1A

The production procedures of a nanofiltration composite layer of Comparative Example 1A (C1A) were the same as the production procedures of the nanofiltration composite layers of E1A to E4A.

Analysis 3: Permeate Flux Through Nanofiltration Composite Membrane and Removal Rate of Divalent Ions of Nanofiltration Composite Membrane The nanofiltration composite membranes of E1A to E4A and C1A were tested under pressure of 100 pounds per square inch (psi) and 2000 parts per million (ppm) magnesium sulfate solutions ($MgSO_{4(aq)}$) were filtered by aforesaid nanofiltration composite membranes respectively to render the removal rates of divalent ions and permeate fluxes at 25° C. Herein, the removal rates of divalent ions were calculated by measuring each conductivity (conductivity$_{(before)}$) of the magnesium sulfate solutions before filtration and each conductivity (conductivity$_{(after)}$) of the magnesium sulfate solutions after filtered with the nanofiltration composite membranes. According to the formula of [(conductivity$_{(before)}$−conductivity$_{(after)}$)/conductivity$_{(before)}$×100%], the results were showed in Table 2 The unit of permeate flux is LMH.

Analysis 4: Removal Rate of Univalent Ions of Nanofiltration Composite Membrane

The nanofiltration composite membranes of E1A to E4A and C1A were tested under pressure of 100 psi and 2000 ppm sodium chloride solutions (NaCl$_{(aq)}$) were filtered by aforesaid nanofiltration composite membranes respectively to render the removal rates of univalent ions. Herein, the removal rates of univalent ions were calculated by measuring each conductivity (conductivity$_{(before)}$) of the sodium chloride solutions before filtration and each conductivity conductivity$_{(after)}$) of the sodium chloride solutions after filtered with the nanofiltration composite membranes. According to the formula of [(conductivity$_{(before)}$−conductivity$_{(after)}$)/conductivity$_{(before)}$×100%], the results were showed in Table 2.

Analysis 5: Molecular Weight Cutoff of Nanofiltration Composite Membrane 1 wt % polyethylene glycol solution was filtered by the nanofiltration composite membranes of E1A to E4A and C1A respectively. The polyethylene glycol solution filtered by each of the nanofiltration composite membranes was collected and tested by liquid chromatograph mass spectrometer to analyze the molecular weight distribution of polyethylene glycol. The results of molecular weight cutoff were showed in Table 2. The unit of molecular weight is Da.

Table 2: Weight percentages of starting materials for preparation of the nanofiltration composite membranes of E1A to E4A and C1A and test results of the properties of the nanofiltration composite membranes of E1A to E4A and C1A

| Ultrafiltration membrane | E1 | E2 | E3 | E4 | C1 |
| --- | --- | --- | --- | --- | --- |
| Weight ratio of the polysulfone to the amphiphilic polymer | 2.4 | 4 | 9.1 | 18.2 | — |
| Nanofiltration composite membrane | E1A | E2A | E3A | E4A | C1A |
| Piperazine (wt %) | 2 | 2 | 2 | 2 | 2 |
| 3,5-Diaminobenzoic acid (wt %) | 0.05 | 0.05 | 0.05 | 0.05 | 0.05 |
| 1,3,5-benzenetricarbonyl trichloride (wt %) | 0.2 | 0.2 | 0.2 | 0.15 | 0.1 |
| Water (wt %) | 97.75 | 97.75 | 97.75 | 97.80 | 97.85 |
| Permeate flux of magnesium sulfate solution (LMH) | 46 | 65 | 74 | 94 | 97 |
| Removal rate of divalent ions (%) | 99.67 | 99.42 | 99.41 | 96.32 | 94.65 |
| Removal rate of univalent ions (%) | 37.26 | 35.72 | 32.65 | 29.32 | — |
| Molecular weight cutoff (Da) | 200-240 | 200-240 | 200-240 | 300-400 | 420-500 |

Results and Discussion

According to Table 2. due to the weight ratio of the polysulfone to the amphiphilic polymer in the polymeric porous layer of the nanofiltration composite membrane ranging from 2 to 20, the removal rates of divalent ions of the nanofiltration composite membranes of E1A to E4A of the instant disclosure were all greater than 96%. Therefore, aforesaid nanofiltration composite membranes could remove high concentration of divalent ions from hard water, and thus were suitable for applying to water softening.

Regarding Table 1 and Table 2, as the amounts of the amphiphilic polymer in the polymeric porous layer increased, the removal rates of divalent ions of the nanofiltration composite membranes of E1A to E4A could be increased to be greater than 96%. The removal rates of divalent ions of the nanofiltration composite membranes of E1A to E3A were greater than 99%. Furthermore, the removal rate of divalent ions of the nanofiltration composite membranes of E1A was greater than 99.5%. In the contrast, in the absence of the amphiphilic polymer of the instant disclosure, the removal rate of divalent ions of the polymeric porous layer of C1A was less than 95%. According to the results above, the nanofiltration composite membrane of the instant disclosure has better efficiency of water softening.

Regarding the nanofiltration composite membranes of E1A to E4A, the permeate flux of the magnesium sulfate solution ranged from 40 LMH to 95 LMH. These results all fell within the acceptable ranges. If only 96% of the removal rate of divalent ions is needed, the nanofiltration composite membrane of E4A can be used. The permeate flux of E4A could reach 94 LMH, which could accelerate the separation of divalent ions in water.

Besides, regarding Table 2, the pores of nanofiltration composite membranes of E1A to E4A could retain substances with molecular weights ranging from 200 Da to 240 Da or from 300 Da to 400 Da. They could apply to separation of substances with molecular weights ranging from 200 Da to 240 Da or from 300 Da to 400 Da.

In conclusion, the nanofiltration composite membrane of the instant disclosure can increase the removal rate of divalent ions and have appropriate permeate flux of divalent ion solution and removal rate of univalent ions. Moreover, the nanofiltration composite membrane of the instant disclosure can separate substances of specific molecular weights in solutions.

Even though numerous characteristics and advantages of the instant disclosure have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A nanofiltration composite membrane, comprising:
a supporting layer comprising a polyester;
a polymeric porous layer formed on the supporting layer, the polymeric porous layer comprising a polysulfone and an amphiphilic polymer represented by the formula below:

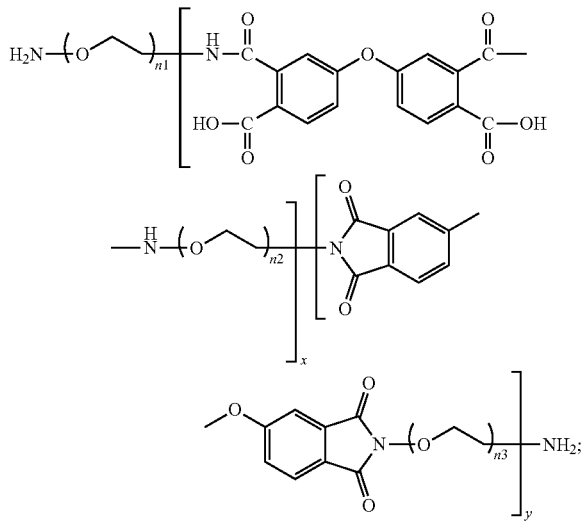

and
an interfacial polymerization layer formed on the polymeric porous layer and comprising polyamide;
wherein n1, n2, n3, x, and y are integers greater than 0, the molecular weight of the amphiphilic polymer ranges from 90,000 to 200,000, and a weight ratio of the polysulfone to the amphiphilic polymer is greater than or equal to 2 and less than or equal to 20.

2. The nanofiltration composite membrane of claim 1, wherein the weight ratio of the polysulfone to the amphiphilic polymer in the polymeric porous layer is greater than or equal to 2 and less than or equal to 10.

3. The nanofiltration composite membrane of claim 1, wherein the thickness of the supporting layer ranges from 0.09 millimeters (mm) to 0.1 mm, the thickness of the polymeric porous layer ranges from 0.02 mm to 0.06 mm, and the thickness of the interfacial polymerization layer ranges from 50 nanometers (nm) to 200 nm.

4. The nanofiltration composite membrane of claim 1, wherein the polyester is polyethylene terephthalate.

5. The nanofiltration composite membrane of claim 1, wherein the polyimide is synthesized by polymerizing piperazine with 1,3,5-benzenetricarbonyl trichloride.

6. The nanofiltration composite membrane of claim 1, wherein a removal rate of divalent ions of the nanofiltration composite membrane is greater than or equal to 96%.

7. The nanofiltration composite membrane of claim 2, wherein a removal rate of divalent ions of the nanofiltration composite membrane is greater than or equal to 96%.

8. The nanofiltration composite membrane of claim 3, wherein a removal rate of divalent ions of the nanofiltration composite membrane is greater than or equal to 96%.

9. The nanofiltration composite membrane of claim 4, wherein a removal rate of divalent ions of the nanofiltration composite membrane is greater than or equal to 96%.

10. The nanofiltration composite membrane of claim 5, wherein a removal rate of divalent ions of the nanofiltration composite membrane is greater than or equal to 96%.

11. The nanofiltration composite membrane of claim 1, wherein a molecular weight cutoff of the nanofiltration composite membrane ranges from 200 Dalton (Da) to 400 Da.

12. The nanofiltration composite membrane of claim 2, wherein a molecular weight cutoff of the nanofiltration composite membrane ranges from 200 Da to 400 Da.

13. The nanofiltration composite membrane of claim 3, wherein a molecular weight cutoff of the nanofiltration composite membrane ranges from 200 Da to 400 Da.

14. The nanofiltration composite membrane of claim 4, wherein a molecular weight cutoff of the nanofiltration composite membrane ranges from 200 Da to 400 Da.

15. The nanofiltration composite membrane of claim 5, wherein a molecular weight cutoff of the nanofiltration composite membrane ranges from 200 Da to 400 Da.

16. The nanofiltration composite membrane of claim 1, wherein the nanofiltration composite membrane has a permeate flux of divalent ion solution ranging from 40 L/m$^2$/hr to 95 L/m$^2$/hr.

17. The nanofiltration composite membrane of claim 2, wherein the nanofiltration composite membrane has a permeate flux of divalent ion solution ranging from 40 L/m$^2$/hr to 95 L/m$^2$/hr.

18. The nanofiltration composite membrane of claim 3, wherein the nanofiltration composite membrane has a permeate flux of divalent ion solution ranging from 40 L/m$^2$/hr to 95 L/m$^2$/hr.

19. The nanofiltration composite membrane of claim 4, wherein the nanofiltration composite membrane has a permeate flux of divalent ion solution ranging from 40 L/m$^2$/hr to 95 L/m$^2$/hr.

20. The nanofiltration composite membrane of claim 5, wherein the nanofiltration composite membrane has a permeate flux of divalent ion solution ranging from 40 L/m$^2$/hr to 95 L/m$^2$/hr.

* * * * *